United States Patent Office 3,137,681
Patented June 16, 1964

3,137,681
POLYMERIZATION PROCESS AND PRODUCT
Robert J. Orr, Sarnia, Ontario, Canada, assignor to Polymer Corporation Limited, Sarnia, Ontario, Canada, a body corporate
No Drawing. Filed Nov. 7, 1956, Ser. No. 620,821
9 Claims. (Cl. 260—82.1)

This invention relates to low temperature emulsion polymerization of olefinic compounds to form products having reactive terminal groups. More particularly it relates to the production of polymers having terminal hydroperoxy groups which can be used as intermediates in the production of highly useful polymeric products.

In the preparation of polymers from two or more monomers by conventional emulsion polymerization techniques, the various monomers enter the growing polymer chain in a more or less random fashion. It is well known that the properties of copolymers depend upon the ratio of the different monomeric units and upon the distribution of these units along the polymer chain. In addition, the difference in properties between conventional copolymers and blends of homopolymers of the individual monomers is believed to be mainly due to the distribution of monomer units along the chain.

It has long been desired to prepare polymers having a prearranged order of monomer units. Such prearrangement may be, for example, a portion of polystyrene joined to a polybutadiene portion followed by another portion of polystyrene. This type of polymer is known as a "block polymer of the type BAB".

Emulsion polymerization may be carried out at relatively low temperatures and in such a process the reaction usually makes use of a so-called redox activation system, that is, the recipe contains both a reducing and an oxidizing agent. This type of recipe is well known in the art and contains, as well as an emulsifying agent, a reducing agent such as sugar, an oxidizing agent such as isopropyl benzene hydroperoxide, an oxidation catalyst such as ferrous sulfate, and a chelating or sequestering agent such as potassium pyrophosphate. Since, in many cases, the monomers being polymerized tend to produce some product of extremely high molecular weight, it is normal practice to include in the charge recipe a material, known as a chain modifying agent, whose function it is to regulate the molecular weight of the product by terminating growing chains. Thus, the molecular weight may be regulated to yield a product with controlled processing characteristics. The regulator heretofore usually preferred is an alkyl mercaptan having from six to sixteen carbon atoms in aliphatic linkage. Once so terminated, a chain is incapable of further linear growth because of the stable nature of the terminal group.

It is an object of the present invention to produce polymers with reactive terminal groups.

It is a further object of the invention to produce polymer molecules terminating in hydroperoxy groups, so that further polymerization either with the same or different monomeric units may readily be effected.

It is a still further object of the invention to produce such polymers in the substantial absence of conventional modifiers, chain terminating agents and in particular in the substantial absence of mercaptans.

It is an additional object of the invention to prepare from the reactive polymers, block polymers of the general configuration BAB where A represents the initial polymer and B represents polymeric units of a monomer whose polymerization is effected by the reactive terminal groups on A.

These and other objects of the present invention are achieved in the process of polymerizing a polymerizable compound, for example an olefin or a conjugated diolefin, either alone or with a copolymerizable compound having the linkage $CH_2=C<$, to a polymer containing terminal hydroperoxy groups, and further characterized by being substantially free of cross links, by means of a low temperature redox type emulsion polymerization, in the absence of a mercaptan modifier, which comprises using sufficient diisopropylbenzene dihydroperoxide, usually greater than 0.50 part by weight based on the polymerizable starting material and preferably from 0.50–20.0 parts by weight, to serve as both an oxidizing agent and a chain terminating agent.

The monomeric materials which may be used in the practice of the present invention comprise organic compounds which can normally be polymerized in emulsion by a free radical mechanism. They must, of course, be materials which do not react with and destroy the diisopropylbenzene dihydroperoxide in the polymerization recipe. Such compounds are now well known in the art and generally contain the characteristic structure $$CH_2=C<$$

having at least one of the disconnected valencies attached to an electronegative group such as a double or triple bond, for example, vinyl, phenyl, nitrile, carboxy or the like. Included in this class of monomers are the conjugated diolefins such as 1,3-butadiene, 2,3-dimethyl-1,3-butadiene, isoprene, piperylene, 2-chloro-1,3-butadiene, 2-bromo-1,3-butadiene and the like; arylolefins such as styrene, alkyl styrenes, p-chloro-styrene, alpha-methyl styrene, vinylnaphthalene and similar derivatives thereof and the like; esters, nitriles and amides of acrylic and substituted acrylic acids such as methyl acrylate, ethyl acrylate, methyl methacrylate, acrylonitrile, methacrylonitrile, methacrylamide and the like; methyl isopropenyl ketone, methyl vinyl ketone, methyl vinyl ether, vinyl acetate, vinyl chloride, vinylidene chloride, vinyl pyridine, and other unsaturated hydrocarbons, esters, alcohols, acids, ethers, etc. of the types described. The unsaturated compounds may be polymerized alone i.e. homopolymerized, or two or more of such compounds which are copolymerizable with each other may be copolymerized.

The temperature of the polymerization of the present invention is generally from 0–35° C., although temperatures outside this range are not precluded. It is preferred to operate at temperatures from 5–30° C. At temperatures above 35° C., the terminal hydroperoxy groups of the polymer tend to decompose and at temperatures below 0° C. it is necessary to use an antifreeze, with the attendant difficulties which are well known in the art.

The amount of diisopropylbenzene dihydroperoxide used in the practice of the invention varies with the amount of emulsifier and the amount of free oxidation catalyst, i.e. the amount of chelating agent, and/or oxidation catalyst, but it usually falls within the range 0.50 to 20 parts by weight based on the monomers. In the absence of chelating agents a charge of 0.20 part diisopropylbenzene dihydroperoxide, together with an equimolar charge of oxidation catalyst, produces polymers according to the present invention, but the yield is generally low. When a chelating agent is present in the polymerization charge, polymer yields of 100 percent are readily obtained; higher quantities of diisopropylbenzene dihydroperoxide and oxidation catalyst are then required. In general, it is desirable to keep the emulsifier charge at a minimum to reduce the requirement for diisopropylbenzene dihydroperoxide ad oxidation catalyst necessary to yield a given molecular weight product. If, for any reason such as improved latex stability, it is desired to increase the emulsifier charge, the average molecular weight of the polymer may be held constant by a suitable increase in the diisopropylbenzene dihydroperoxide and oxidation catalyst charges.

Suitable coagulation and recovery of the polymers of the present invention cannot be achieved in the conventional manner. Conventional brine-acid coagulation frequently results in the formation of a highly gelled insoluble product, and alcohol coagulation often results in the formation of a very fine dispersion of polymer which can be separated and recovered only with difficulty. For non-polar polymers, a satisfactory crumb is obtained when the coagulating alcohol contains a trace of a weak acid such as acetic, or suitable coagulation may be effected by adding the latex to a solution of a salt, such as sodium chloride, which has been slightly acidified. The size and texture of the crumb varies with the actual acid concentration. Many polar polymers are soluble or partially soluble in alcohol and the most satisfactory method of coagulating them is by freezing provided that the latices are not freeze-thaw stable.

Since the polymeric dihydroperoxides tend to decompose at higher temperatures, the coagulated product must be dried at a relatively low temperature, preferably below 30° C. For the same reason, the dried polymer must be stored at a relatively low temperature. An alternative storage method is to prepare a solution of the polymer in a suitable solvent which may be stored at room temperature for prolonged periods without danger of appreciable degradation.

The polymer containing terminal hydroperoxy groups may be reacted with additional monomer, either of the same or of a different type. This second stage polymerization may be carried out in solution provided that the solvent does not react with and thereby destroy the hydroperoxy groups. Residual diisopropylbenzene dihydroperoxide remaining from the initial polymerization must first be removed to avoid the formation of homopolymer from the new monomer. This may conveniently be accomplished by precipitating the polymer from solution and redissolving it in fresh solvent. The solution and reprecipitation may be repeated until the polymer is essentially free of residual dihydroperoxide. The second monomer may then be added to a solution of the purified initial polymer and polymerization effected by heating the solution to the temperature necessary to decompose the polymeric dihydroperoxide. The actual temperature depends upon the solution characteristics. For example, the solvent, the polymeric dihydroperoxide and the added monomer are all believed to affect the decomposition temperature so that it generally varies from about 50° C. to about 100° C.

The second stage polymerization may also be carried out in emulsion and this is especially desirable when the polymeric dihydroperoxide is insoluble or only partially soluble in a suitable solvent. An example of such polymeric dihydroperoxide is a high acrylonitrile content butadiene-1,3 acrylonitrile copolymer. It may be preferable to prepare an emulsion of the dried polymer by any of the well known techniques or the second stage polymerization may be carried out without even coagulating the initial latex. In the latter case, in order to avoid the production of homopolymer, it is necessary to destroy residual diisopropylbenzene dihydroperoxide in the latex by some suitable method such as by the addition of a water soluble reducing agent.

The following examples are given to illustrate the invention, all quantities being in parts by weight unless otherwise stated:

EXAMPLE I

Butadiene-1,3 and styrene were copolymerized at 12.8° C. using the following charge recipe:

| | |
|---|---|
| Butadiene-1,3 | 72.0. |
| Styrene | 28.0. |
| Water | 180.0. |
| Potassium fatty acid soap | 4.5. |
| Sodium chloride | 0.4. |
| Ferrous sulfate heptahydrate | 0.8 initially. |
| Then 3 increments of | 0.08 each. |
| Diisopropylbenzene dihydroperoxide | 0.20 initially. |
| Then 3 increments of | 0.20 each. |

The results are given below in Table I.

Table I

| Amount of Ferrous Sulfate Heptahydrate | Amount of Diisopropylbenzene Dihydroperoxide | Reaction Time (hours) | Percent Conversion | Intrinsic Viscosity | Percent insoluble polymer |
|---|---|---|---|---|---|
| 0.88 | 0.40 | 17 | 11.6 | 3.18 | 0 |
| 0.96 | 0.60 | 18.75 | 13.0 | ------ | 0 |
| 1.04 | 0.80 | 21.75 | 14.0 | ------ | 0 |

The instrinsic viscosity determinations were carried out in toluene at 30° C., and the values represent a measure of the molecular weight. These results indicate that, in the absence of a chelating agent, only a small amount of diisopropylbenzene dihydroperoxide is necessary to produce soluble polymers. In addition, a low conversion of monomers into a completely soluble polymer of relatively high molecular weight is achieved.

EXAMPLE II

Butadiene-1,3 and styrene were copolymerized at 12.8° C. according to the following charge recipe:

| | |
|---|---|
| Butadiene-1,3 | 72.0 |
| Styrene | 28.0 |
| Water | 320.0 |
| Potassium fatty acid soap | 5.0 |
| Ferrous sulfate heptahydrate | 10.0 |
| Potassium pyrophosphate | 10.0 |
| Diisopropylbenzene dihydroperoxide | 10.0 |

The monomers reacted to 100 percent conversion in 17 hours to produce a completely soluble polymer having an intrinsic viscosity in toluene of 0.61, which indicated a relatively low molecular weight polymer.

EXAMPLES III–X

A series of polymerizations was carried out to 100% conversion using a charge recipe similar to that in Example II, except that the amounts of ferrous sulfate and diisopropylbenzene dihydroperoxide were varied. The results are given in Table II.

Table II

| Example | Ferrous Sulfate Heptahydrate | Diisopropylbenzene Dihydroperoxide | Intrinsic Viscosity |
|---|---|---|---|
| III | 0.2 | 0.2 | 1.6 |
| IV | 0.5 | 0.5 | 1.0 |
| V | 1.0 | 1.0 | 0.84 |
| VI | 3.0 | 3.0 | 0.83 |
| VII | 5.0 | 5.0 | 0.78 |
| VIII | 6.0 | 6.0 | 0.52 |
| IX | 7.0 | 7.0 | 0.74 |
| X | 10.0 | 10.0 | 0.61 |

These results show that the intrinsic viscosity in toluene at 30° C., and hence the molecular weight of the polymer, is dependent to a large degree upon the amounts both of diisopropylbenzene dihydroperoxide and of ferrous sulfate heptahydrate used. All the polymers except those of Examples III and IV were gel free. Those in Examples III and IV were partially insoluble and the intrinsic viscosity values shown are for the soluble portion. However, these show that the molecular weight of the soluble portion is quite high.

These data show that the lowest charge of diisopropylbenzene dihydroperoxide, when used in conjunction with a ferrous sulfate oxidation catalyst and a potassium pyrophosphate chelating agent, which can be used to produce a completely soluble polymer at 100 percent conversion in this recipe lies between 0.5 and 1 part based on 100 parts of the polymerizable monomers. Of course, the reaction may be stopped short of 100 percent conversion if a completely soluble polymer is desired at still lower catalyst levels. Since it is usually preferable, in the interests of economy, to carry polymerization reactions to a high conversion, it will usually be desirable to use a charge of at least 0.5 part of diisopropylbenzene dihydroperoxide in the practice of the present invention.

In these examples, the amount of oxidation catalyst was varied simultaneously with the amount of diisopropylbenzene dihydroperoxide. This was merely for convenience, since they may be varied independently to control the molecular weight of the polymer.

EXAMPLES XI–XIV

A series of polymerizations was carried out according to the charge recipe of Example II, except that the amount of soap charged was varied. The effect on the intrinsic viscosity in toluene at 30° C. and the solubility of the polymers formed was noted. The results are given in Table III.

*Table III*

| Example | Soap Charge | Intrinsic Viscosity | Percent Insoluble Polymer |
|---|---|---|---|
| XI | 7.0 | 0.39 | 0 |
| XII | 10.0 | 0.67 | 0 |
| XIII | 15.0 | 1.00 | 0 |
| XIV | 20.0 | 1.02 | 0 |

These data show that a greater charge of emulsifier, i.e., soap, results in the formation of polymers having higher intrinsic viscosity and hence greater molecular weights.

EXAMPLES XV–XXII

A series of polymerizations was carried out as in Example II, except that various monomer combinations were used and in Example XXI both the diisopropylbenzene dihydroperoxide and the ferrous sulfate heptahydrate charges were 6.0 parts rather than 10.0 parts. The conversion and solubility of each polymer were determined, and the intrinsic viscosity was determined on a representative number of them. The results are given in Table IV.

*Table IV*

| Example No. | Monomers | Percent Conversion | Percent Insoluble | Intrinsic Viscosity |
|---|---|---|---|---|
| XV | Isoprene/Styrene (72/28) | 100 | 0 | 0.66 |
| XVI | Butadiene-1,3/alpha-methylstyrene (72/28) | 100 | 0 | 0.80 |
| XVII | Butadiene-1,3/chlorostyrene (72/28) | 100 | 0 | 0.63 |
| XVIII | Butadiene-1,3/methylmethacrylate (72/28) | 100 | 0 | |
| XIX | Butadiene-1,3/acrylamide (72/28) | 100 | 0 | |
| XX | Butadiene-1,3/vinyl pyridine (72/28) | 100 | 0 | 0.28 |
| XXI | Chlorostyrene | 100 | 0 | 0.26 |
| XXII | Butadiene-1,3/acrylonitrile (95/5) | 100 | 0 | |

These data show that low molecular weight soluble polymers may be produced from a variety of monomers in the process of the present invention.

EXAMPLE XXIII

When a 72/28 mixture of butadiene-1,3/and acrylonitrile was polymerized according to the recipe used in Example II, the polymerization reaction proceeded to 100% conversion but the product was found to be insoluble in all solvents. The reason for this is believed to be that at the relatively high pH associated with fatty acid soaps, there is a reaction between acrylonitrile and the dihydroperoxide.

Therefore a 72/28 mixture of butadiene and acrylonitrile was polymerized in a recipe similar to that of Example II except that the potassium fatty acid soap was replaced by dodecylamine hydrochloride and the pH of the emulsion adjusted to 4.5 with acetic acid. The reaction went to 100 percent conversion in 17 hours and resulted in a soluble product having an intrinsic viscosity of 0.26 in methyl ethyl ketone at 30° C.

The following examples are given to show the polymerization promoting ability of the polymers containing terminal hydroperoxy groups as prepared by the process of the invention:

EXAMPLES XXIV–XXVI

In these examples, a polymer prepared according to the present invention was coagulated in slightly acidified alcohol and dried at room temperature.

In each case, the prepared polymers containing terminal hydroperoxy groups were freed of residual diisopropylbenzene dihydroperoxide by precipitation with methanol from benzene. The precipitation step was repeated two, three, or four times. The purified polymer was then prepared as a 1.5% solution in benzene and styrene, in which styrene made up about 67 percent. After maintaining the solution at 50° C. for 17 hours, the product was precipitated and its intrinsic viscosity in toluene at 30° C. determined.

In Example XXIV, the initial polymer was a copolymer of butadiene-1,3, and styrene, in the ratio of 72 to 28, prepared according to Example II.

In Example XXV, the initial polymer was a copolymer of butadiene-1,3 and alpha-methylstyrene, in the ratio of 72/28, prepared according to Example XVI.

In Example XXVI, the initial polymer was a copolymer of isoprene and styrene, in the ratio of 72 to 28, prepared according to Example XV. The results are given below in Table V.

*Table V*

| Example No. | Initial Polymer | No. of Purifying Steps | Percent Increase in Polymer Content in 24 hours | Increase in Intrinsic Viscosity |
|---|---|---|---|---|
| XXIV | Butadiene-1,3/styrene (72/28). | 2 | 38 | From 0.61 to 1.20. |
| | | 4 | 10 | |
| XXV | Butadiene-1,3/alpha-methyl-styrene (72/28). | 3 | 163 | From 0.81 to 1.41. |
| XXVI | Isoprene/Styrene (72/28) | 3 | 137.5 | |

These results show that the polymer containing terminal hydroperoxy groups prepared according to the present invention is capable of initiating further polymerization. The new portion of the polymer chain, as proved below in Example XXIX is characteristic of the added monomer. Hence the process provides a means of producing block polymers having special physical properties, which correspond to the generic class BAB where B corresponds to the polymeric units of the added monomer and A is the original reactive polymer.

EXAMPLES XXVII AND XXVIII

Two homopolymers were prepared as in Example II except that in Example XXVII styrene made up the total monomer charge while in Example XXVIII butadiene-1,3 made up the total charge. In addition, in Example XXVII, both the charge of diisopropylbenzene dihydroperoxide and oxidation catalyst were 6 parts.

The polymer containing terminal hydroperoxy groups prepared by Example XXVII had an intrinsic viscosity of 0.73 in toluene at 30° C. On further polymerization as in Example XXIV–XXVI, it was found that the increase in polymer content was 228 percent. The polybutadiene of Example XXVIII was completely soluble and produced an increase in polymer content of the solution of 83 percent.

EXAMPLE XXIX

The product of the second stage polymerization in Example XXVIII was tested to prove that styrene actually was polymerizing onto the performed polybutadiene containing terminal hydroperoxy groups.

A film of the product was cast and then mildly aged in air at 45° C. for 72 hours to cross-link the butadiene molecules. Such treatment would not be expected to cross-link polystyrene molecules. The film was then extracted with successive portions of benzene to dissolve the soluble material. The cross-linked polymer which remained was dried and analyzed for bound styrene content by the conventional refractive index method. It was found to contain 14 percent bound styrene.

EXAMPLE XXX

A series of polymeric dihydroperoxides of varying structure were prepared at 10 parts activator and catalyst and reacted as in Examples XXIV to XXVI, with various monomer compositions in order to study the overall reactivity factors influencing the ease of preparation of polymers in the second stage polymerization process. Each solution used in the second stage reaction was made up by weight of 5.5 percent polymeric dihydroperoxide, 55 percent monomer and 39.5 percent benzene. The results are shown in Table VI.

Table VI

| Polymer Composition | Monomer Compositions | Percent Solids Increase | |
|---|---|---|---|
| | | 50° C. | 100° C. |
| Polybutadiene | Styrene | 122 | |
| | Vinyl pyridine | 0 | 300 |
| | Butadiene-1, 3/styrene (72/28) | 0 | 500 |
| | Methyl methacrylate | 0 | (¹) |
| | Chlorostyrene | 1,200 | |
| Butadiene-1, 3/Methyl Methacrylate 72/28 | Styrene | 0 | (¹) |
| | Vinyl pyridine | 0 | 270 |
| | Methyl methacrylate | 0 | (¹) |
| | Chlorostyrene | (²) | (¹) |
| Polystyrene | Vinyl pyridine | 0 | 119 |
| | Butadiene-1, 3/stryene (72/28) | 0 | 134 |
| | Methyl methacrylate | 0 | (¹) |
| | Chlorostyrene | (²) | (¹) |
| Butadiene-1,3/Styrene 72/28 | Styrene | (²) | (¹) |
| | Vinyl pyridine | 0 | 200 |
| | Butadiene-1, 3/styrene (72/28) | 0 | 332 |
| | Methyl methacrylate | 0 | (¹) |
| | Chlorostyrene | (²) | (¹) |
| Polymethyl methacrylate | Styrene | 0 | 615 |
| | Vinyl pyridine | 0 | 43 |
| | Butadiene-1, 3/styrene (72/28) | 0 | 173 |
| | Chlorostyrene | 0 | (¹) |

¹ Very high degrees of reaction precluded any quantitative measurement since reaction mixture had become solid.
² Solids not measured. Definite increase in solution viscosity indicated appreciable polymerization.

The above data indicate two facts:

(1) The use of monovinyl compounds as monomers in the second stage polymerization yields a more active system than conjugated dienes.

(2) The activity of the system decreases with the increasing polarity of the monomer-polymer combination, the system non-polar polymer-non-polar monomer being most active and the system polar polymer-polar monomer being least active.

What I claim is:

1. Isolatable polymers characterized by their ability to produce block polymers free of graft copolymers and homopolymers and comprising polymeric chains having a hydroperoxide group at each end thereof, the polymeric chain being selected from the group consisting of polybutadiene, polystyrene, polychlorostyrene, polymethyl methacrylate, polyvinyl pyridine, isoprene/styrene copolymer, butadiene-1,3/alpha-methylstyrene copolymer, butadiene-1,3/chlorostyrene copolymer, butadiene-1,3/methyl methacrylate copolymer, butadiene-1,3/acrylamide copolymer, butadiene-1,3/vinyl pyridine copolymer, butadiene-1,3/acrylonitrile copolymer and butadiene-1,3/styrene copolymer.

2. The process of producing isolatable polymers, characterized by their ability to produce block polymers, the polymeric molecules of which have a hydroperoxy group at each end thereof, which comprises polymerizing a polymerizable olefinic compound having the linkage $CH_2=C<$ in which at least one of the disconnected valencies is attached to an electro-negative group in aqueous emulsion by means of a redox-type polymerization at a temperature of 0–35° C. in the presence of diisopropylbenzene dihydroperoxide as both the oxidizing agent and as the sole chain terminating agent, said dihydroperoxide being present in the amount of about 0.50 to about 20 parts by weight based on the polymerizable olefinic compound, whereby to produce polymeric molecules having terminal hydroperoxy groups at each end thereof.

3. The process of producing isolatable polymers, characterized by their ability to produce block polymers, the polymeric molecules of which have a hydroperoxy group at each end thereof, which comprises polymerizing a conjugated diolefin having 4–12 carbon atoms in aqueous emulsion by means of a redox-type polymerization at a temperature of 0–35° C. in the presence of diisopropylbenzene dihydroperoxide as both the oxidizing agent and as the sole chain terminating agent, said dihydroperoxide being present in the amount of about 0.50 to about 20 parts by weight based on the total weight of polymerizable compounds, whereby to produce polymeric molecules having terminal hydroperoxy groups at each end thereof.

4. The process as claimed in claim 3 in which said conjugated diolefin is selected from the group consisting of butadiene-1,3 and isoprene.

5. The process as claimed in claim 6 in which said copolymerizable compound is selected from the group consisting of styrene, alpha-methylstyrene, chlorostyrene, methyl methacrylate, vinyl pyridine, acrylamide and acrylonitrile.

6. The process of producing isolatable polymers, characterized by their ability to produce block polymers, the polymeric molecules of which have a hydroperoxy group at each end thereof, which comprises copolymerizing a conjugated diolefin having 4–12 carbon atoms in admixture with a copolymerizable compound having a linkage $CH_2=C<$ in which at least one of the disconnected valencies is attached to an electronegative group in aqueous emulsion by means of a redox-type polymerization reaction at a temperature of 0–35° C. in the presence of diisopropylbenzene dihydroperoxide as both the oxidizing agent and as the sole chain terminating agent, said dihydroperoxide being present in the amount of about 0.50 to about 20 parts by weight based on the total weight of the polymerizable compounds, whereby to produce polymeric molecules having terminal hydroperoxy groups at each end thereof.

7. The process as claimed in claim 6 in which said conjugated diolefin is selected from the group consisting of butadiene-1,3 and isoprene.

8. The process as claimed in claim 7 in which the copolymerizable compound is selected from the group consisting of styrene, alpha-methylstyrene, chlorostyrene, methyl methacrylate, vinyl pyridine, acrylamide and acrylonitrile.

9. The process of producing isolatable polymers, characterized by their ability to produce block polymers, the polymeric molecules of which have a hydroperoxy group at each end thereof, which comprises polymerizing a polymerizable olefinic compound having the linkage $CH_2=C<$ in which at least one of the disconnected valencies is attached to an electronegative group in aqueous emulsion in a redox-type polymerization at a temperature of 0–35° C. in the presence of ferrous sulphate and of diisopropylbenzene dihydroperoxide as both the oxidizing agent and as the sole chain terminating agent, said dihydroperoxide being present in the amount of about 0.50 to about 20 parts by weight based on the polymerizable olefinic compound, whereby to produce polymeric molecules having terminal hydroperoxy groups at each end thereof.

References Cited in the file of this patent
UNITED STATES PATENTS

| | | |
|---|---|---|
| 2,460,300 | Le Fevre et al. | Feb. 1, 1949 |
| 2,610,965 | Vandenberg | Sept. 16, 1952 |
| 2,666,042 | Nozaki | Jan. 12, 1954 |
| 2,830,975 | Irvin | Apr. 15, 1958 |
| 2,834,747 | Short et al. | May 13, 1958 |
| 2,837,496 | Vandenberg | June 3, 1958 |

OTHER REFERENCES

Mason and Manning: The Technology of Plastics and Resin, 1945, Van Nostrand Co., New York, pp. 378–381.